United States Patent [19]
Knutson

[11] Patent Number: 5,987,073
[45] Date of Patent: Nov. 16, 1999

[54] SYMBOL TIMING RECOVERY NETWORK FOR A CARRIERLESS AMPLITUDE PHASE (CAP) SIGNAL

[75] Inventor: Paul Gothard Knutson, Indianapolis, Ind.

[73] Assignee: Thomson Consumer Electronics, Inc., Indianapolis, Ind.

[21] Appl. No.: 08/825,243

[22] Filed: Mar. 27, 1997

[51] Int. Cl.[6] .................................................. H04L 27/22
[52] U.S. Cl. .......................... 375/326; 375/332; 375/344; 329/304
[58] Field of Search ..................................... 375/320, 321, 375/326, 329, 332, 344, 354; 329/304, 307, 308

[56] References Cited

U.S. PATENT DOCUMENTS

| | | | |
|---|---|---|---|
| 4,253,184 | 2/1981 | Gitlin et al. ............................. | 375/232 |
| 4,871,975 | 10/1989 | Nawata et al. ........................... | 329/308 |
| 5,796,786 | 8/1998 | Lee .......................................... | 375/326 |
| 5,809,069 | 9/1998 | Polley et al. ............................. | 375/222 |

OTHER PUBLICATIONS

Floyd M. Gardner, A BPSK/QPSK Timing–Error Detector for Sampled Receivers, IEEE Transactions on Communications, vol. COM–34, No. 5, May 1986, pp. 423–429.

Floyd M. Gardner, Interpolation in Digital Modems—Part I: Fundamentals, IEEE Transactions on Communications, vol. 41, No. 3, Mar. 1993, pp. 501–507.

Lars Erup, Floyd M. Gardner, Robert A. Harris, Interpolation in Digital Modems—Part II: Implementation and Performance, IEEE Transactions on Communications, vol. 41, No. 6, Jun. 1993, pp. 998–1008.

Edward A. Lee et al., *Digital Communication*, Copyright ©1988 by Kluwer Academic Publishers, Section 15—Timing Recovery, pp. 561–586.

*Primary Examiner*—Young T. Tse
*Attorney, Agent, or Firm*—Joseph S. Tripoli; Eric P. Herrmann; Ronald H. Kurdyla

[57] ABSTRACT

A symbol timing recovery (STR) error detector includes a complex multiplier and a Gardner-type symbol timing error estimator for operation with carrierless amplitude phase (CAP) signals. Quadrature Ir and Qr signals from the system are input to the complex multiplier, which also receives signals from a numerically controlled oscillator operating at the CAP center frequency. The output of the complex multiplier is provided to the input of the Gardner STR error estimator. An added frequency shift allows the Gardner error estimator to function with CAP signals. The output from the error estimator is provided to a loop filter the output of which is provided to an oscillator which generates the symbol timing information for a symbol sampling network.

9 Claims, 4 Drawing Sheets

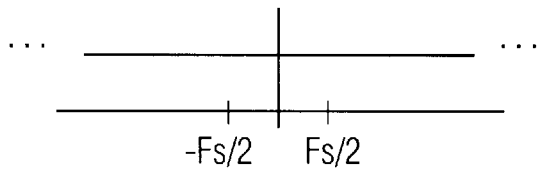
FIG. 4a
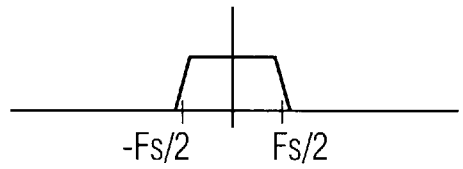
FIG. 4b
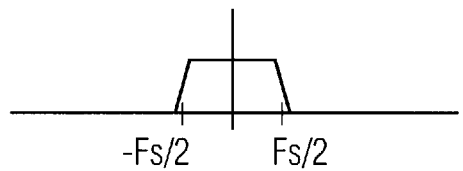
FIG. 4c
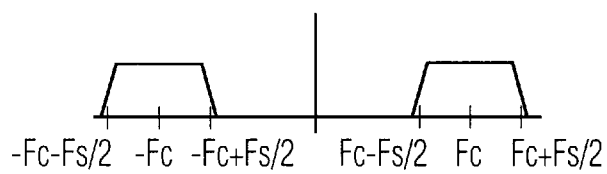
FIG. 4d
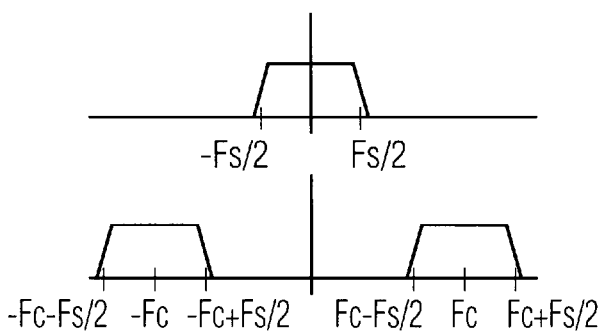
FIG. 4e
FIG. 4f
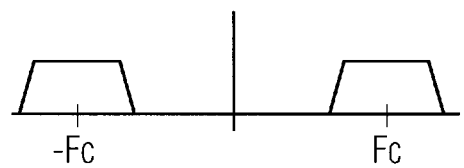
FIG. 4g
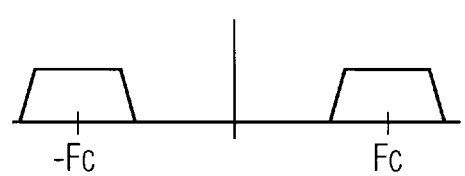
FIG. 4h
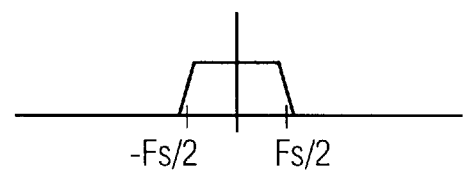
FIG. 4i

SYMBOL TIMING RECOVERY NETWORK FOR A CARRIERLESS AMPLITUDE PHASE (CAP) SIGNAL

FIELD OF THE INVENTION

This invention concerns a symbol timing recovery (STR) network in a digital signal processing system. In particular, the invention concerns an error estimator in an STR network for use with Carrierless Amplitude Phase (CAP) signals.

DESCRIPTION OF RELATED ART

Carrierless Amplitude Phase (CAP) is the modulation format chosen for FTTC (Fiber to the Curb) cable distribution systems. For a useful discussion, see DAVIC 1.0 specification part 08, Lower Layer Protocols and Physical Interfaces, 1995 (Rev. 5.0) and Werner, J. J., Tutorial on Carrierless AM/PM, Jun., 23, 1992, UTP Development Forum, ANSI X 3T9.5 TP/PMD Working Group. CAP is intended for single channel systems without frequency division channelization. The system directly generates a "passband" signal by filtering I and Q symbol components with orthogonal frequency shifted pulse shaping filters such as shown in FIG. 1. This passband is slightly above DC to allow POTS (Plain Old Telephone Service) to coexist on the same twisted pair channel as CAP and to avoid bands highly affected by impulse noise generators. POTS signal frequencies occupy the band between DC and the CAP frequency spectrum. The CAP receiver uses pulse shaping filters similar in frequency response to those at the transmitter, and the filter output is directly sampled and used as hard or soft decision data for data recovery. FIG. 2 illustrates a block diagram of a portion of a CAP receiver.

There are several techniques known in the prior art for detecting timing errors in a symbol timing recovery (STR) system. One of the most useful techniques is described in a paper entitled "A BPSK/QPSK Timing-Error Detector for Sampled Receivers" by Floyd M. Gardner, IEEE Transactions on Communications, Volcom-34, No. 5, May, 1986. A relatively simple algorithm, or technique, for detecting the timing error of a synchronous, band-limited BPSK or QPSK data stream is described therein. The technique requires only two samples per symbol for operation. One of the two samples is also used for symbol detection. While the technique is known in other contexts, it is not known in the context of CAP signal processing.

SUMMARY OF THE INVENTION

In accordance with the principles of the present invention, a symbol timing recovery network for a CAP signal includes a multiplier responsive to received CAP signals and to a reference signal at the center frequency of the CAP signal band. The multiplier out signal is applied to an error estimator which produces a timing error signal output. The error signal is used to control the operation of a network including a symbol sampling circuit. The estimator eg., a Gardner-type estimator, is substantially insensitive to carrier frequency offset.

BRIEF DESCRIPTION OF THE DRAWINGS

FIG. 4a illustrates the unfiltered symbol data impulse stream.

FIG. 4b illustrates a QAM pulse shaping filter characteristic.

FIG. 4c illustrates a QAM baseband complex spectrum.

FIG. 4d illustrates the QAM IF/RF spectrum.

FIG. 4e illustrates the QAM demodulated to complex baseband.

FIG. 4f illustrates the CAP I and Q pulse shaping filter characteristics.

FIG. 4g illustrates the CAP spectrum.

FIG. 4h illustrates the demodulated CAP signal.

FIG. 4i illustrates the CAP signal frequency as shifted to complex baseband.

DETAILED DESCRIPTION OF THE INVENTION

In the following description, like numbers will be used to identify like elements in different Figures.

Figure 1:
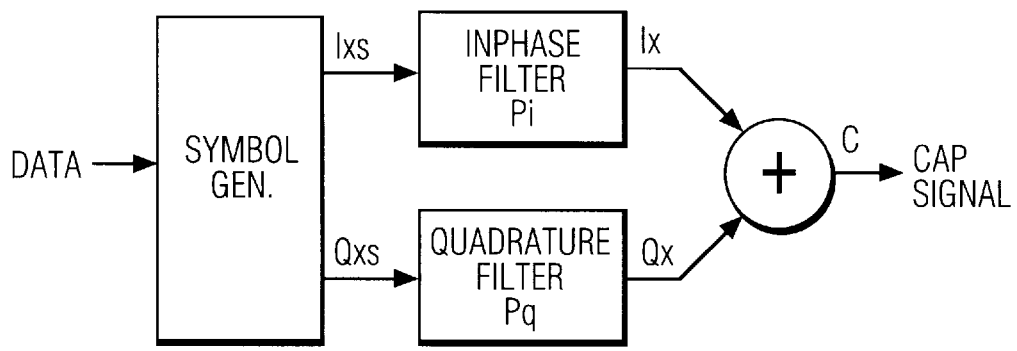
FIG. 1 illustrates a prior art CAP transmitter.
Figure 2:
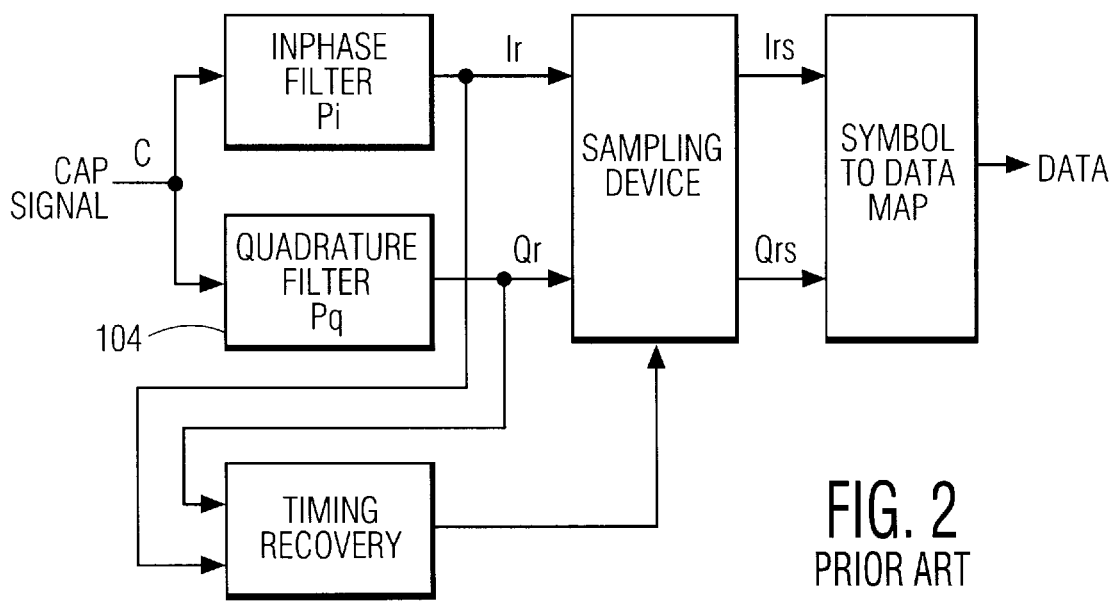
FIG. 2 illustrates a prior art CAP receiver.
Figure 3:
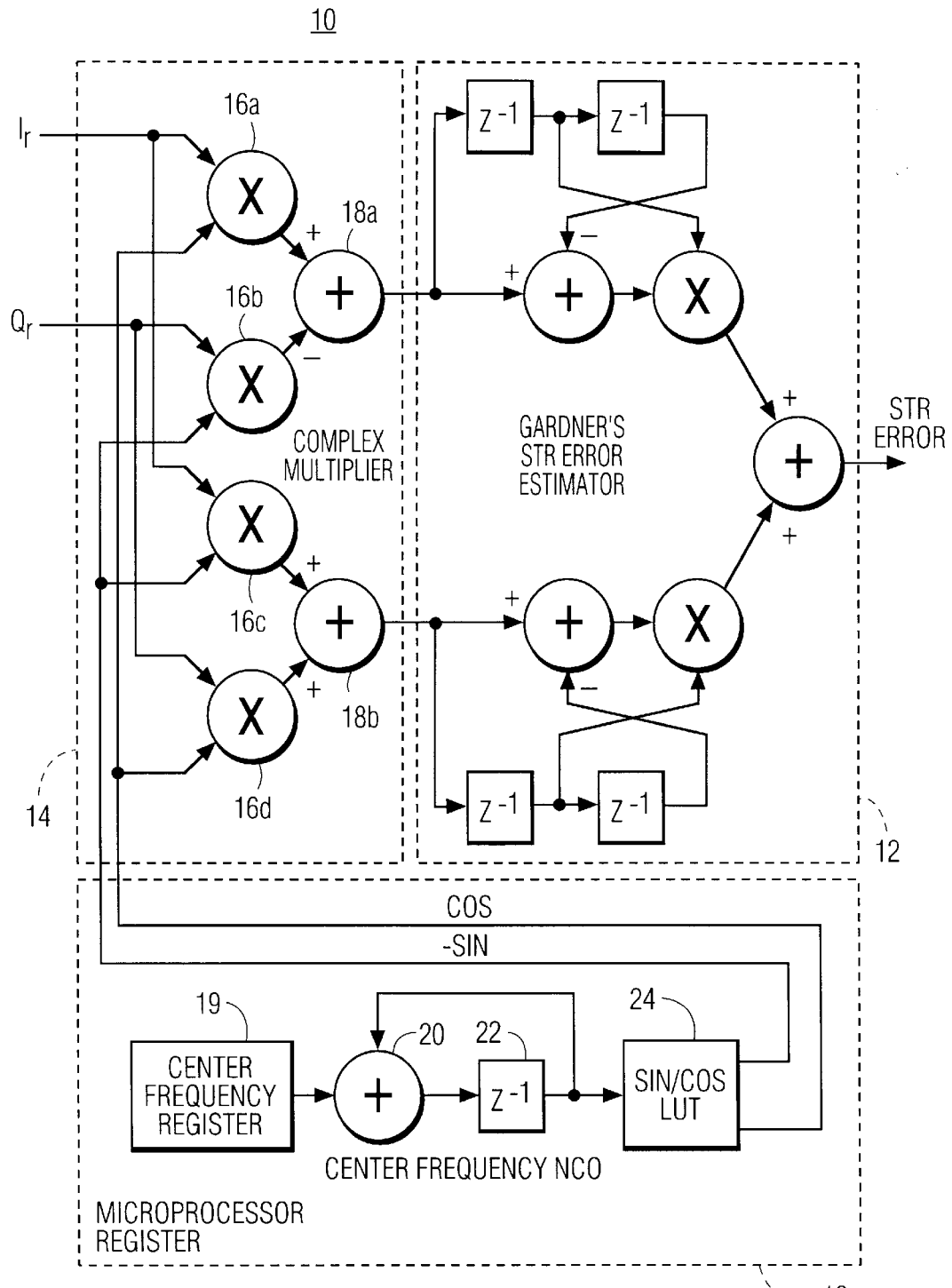
FIG. 3 illustrates the preferred embodiment of the STR error estimator as employed with CAP signals.

The preferred embodiment 10 of the STR error estimator for use with a CAP signal is illustrated in FIG. 3. A conventional, prior art STR error estimator 12 based upon Gardner's technique provides the STR error output. A Gardner-type estimator is substantially insensitive to a carrier frequency offset. Estimator 12 comprises an arrangement of adder, multiplier and delay elements ($Z^{-1}$) as shown. Because the STR error estimator 12 is known it will not be described in detail. The input to STR error estimator 12 is provided by a complex multiplier circuit 14 which includes four multiplier subcircuits 16a–16d and two adding circuits 18a and 18b. Two quadrature signals $I_r$ and $Q_r$ from preceding quadrature pulse shaping and bandpass filters (eg., filters Pi and Pq in FIG. 2) provide a pair of inputs respectively to circuits 16a–16d, such that signal $I_r$ provides an input to multipliers 16a and 16c and signal $Q_r$ provides an input to 16b and 16d. Numerical controlled oscillator (NCO) 16 operates at a fixed frequency Fc, corresponding to the CAP center frequency, for producing cosine and -sine output signals of the center frequency. The cosine signal is fed as a second input to multipliers 16a and 16d, whereas the minus sine signal is fed as a second input to multipliers 16b and 16c. The center frequency, a known characteristic of the CAP signal, is produced by register 19. Its output is fed to adder 20, the output of which is fed to delay element 22. Delay element 22 has an output which is fed back in a loop to adder 20. The output of delay element 22 is also fed as an input to a sine/cosine lookup table (LUT) 24 which produces the quadrature outputs cosine and -sine as inputs to the complex multiplier 14. With the addition of NCO 16 and complex multiplier 14 together with a Gardner-type estimator which is insensitive to a carrier frequency offset, known QAM symbol timing recovery techniques may be used. The CAP signal is shifted to baseband by the action of multiplier 14 in response to the complex exponential (cos+sine) signal from NCO 16 at the center frequency of the CAP signal.

By means of elements 14 and 16 preferred embodiment 10 includes provision for shifting the spectrum of a CAP signal to baseband for the purpose of symbol timing recovery. While the symbol information of this spectrally shifted CAP is spinning at the CAP center frequency Fc, the spectral content is similar to baseband QAM. FIGS. 4a–4i illustrate the relationship of the spectrum of QAM and CAP signals. The CAP filters (eg., filters Pi and Pq in FIG. 2) exhibit a filter response as shown in FIG. 4f to produce a filtered signal as shown in FIG. 4g from the wide baseband symbol data impulse stream illustrated in FIG. 4a. Fs is the symbol frequency. Consequently, the CAP signal is demodulated, as shown in FIG. 4h, when filtered by the receiver's frequency shifted root raised cosine filter (eg., the in-phase and quadrature filters in FIG. 2) and the data is recovered by sampling at the correct time. A carrier recovery network is not required. Only a timing recovery network is needed. When the received CAP spectrum is shifted to baseband, as illustrated in FIG. 4i, the spectrum matches the demodulated QAM signal illustrated in FIG. 4e, for which timing recovery methods are known. The Gardner STR error estimator technique produces an output value STR Error which is on the average proportional to the symbol timing phase error, when stimulated by random constellation data. A randomized bitstream is required for operation, randomized either by scrambling or by using high entropy coded data, or both. This is also true of a QAM STR error estimator. The filter in the STR loop (110 in FIG. 5) averages the STR error estimate.

Figure 5:
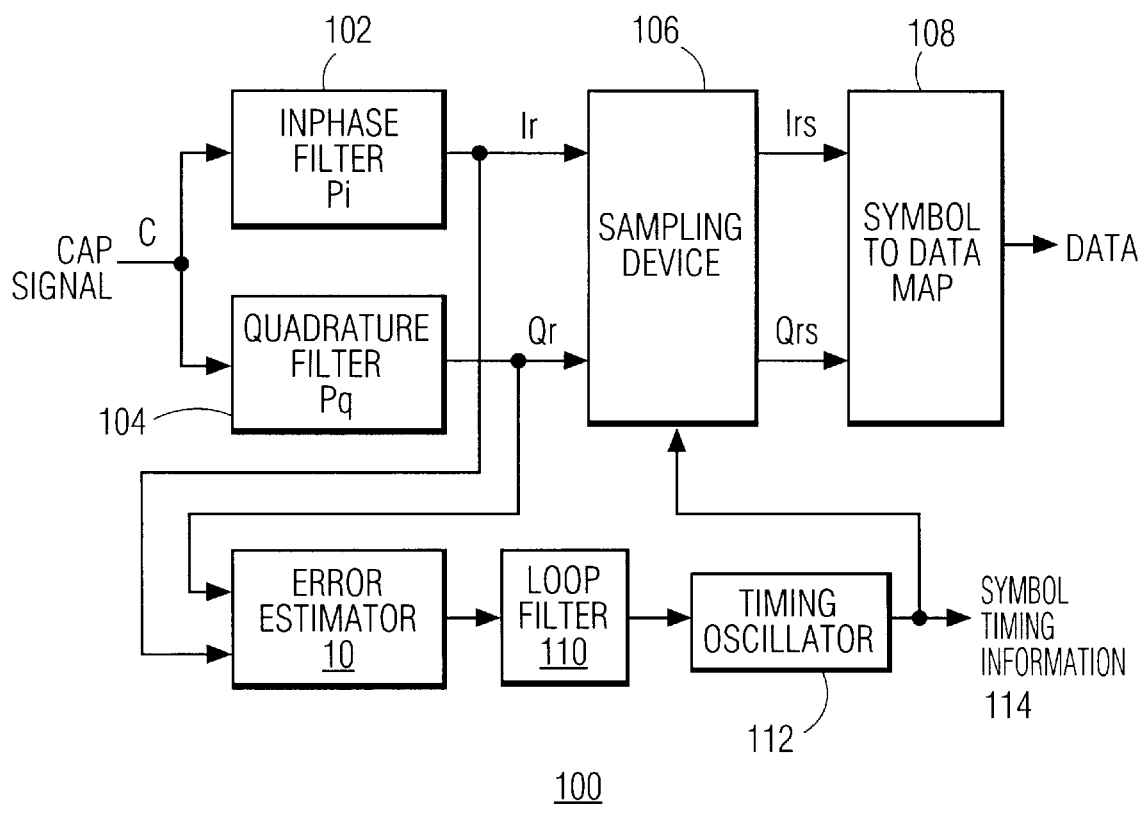
FIG. 5 illustrates the STR error estimator, shown in FIG. 3, in the context of a symbol timing recovery network.

FIG. 5 illustrates the timing error estimator 10 in the context of a symbol timing control network 100. Symbol timing network 100 is associated with an InPhase Filter Pi 102, a quadrature filter Pq 104, a symbol sampling circuit 106, and a symbol-to-data map 108, similar to that described with regard to the prior art CAP receiver illustrated in FIG. 2. The Ir output of InPhase Filter 102 provides one input to error estimator 10. The Qr output quadrature filter Pq 104 provides a second input to error estimator 10. Error estimator 10 is similar to the error estimator described in connection with FIG. 3. By shifting the CAP signal to baseband (FIG. 4i) by means of networks 14 and 16 (FIG. 3), a spectrum is produced which matches the spectrum of a demodulated QAM signal, as shown in FIG. 4e, for which timing recovery methods are known.

The STR error signal from unit 10 is provided to an input of loop filter 110, the output of which provides an input to timing oscillator 112 which produces the output symbol timing information 114. This information is essentially a sampling clock for controlling the symbol sampling operation of circuit 106. By using a low pass filter in the STR loop, averaging of the STR error estimate is achieved. Filter 110 is a second order, proportional and integral filter as known.

The output signal from filter 110 is provided to an analog-to-digital converter (not shown) before being received by oscillator 112. Timing oscillator 112 can be either a voltage controlled oscillator generating the signal processing clock, or an NCO in an interpolator based symbol timing recovery system. A suitable signal processing clock is described in a copending U.S. patent application Ser. No. 08/721,778 of Paul G Knutson et al. filed Sep. 25, 1996. Symbol timing information 114 is applied to a control input of sampling circuit 106, which captures symbol data at "eye" openings of the received signal pattern. Sampler 106 can comprise an analog-to-digital converter if filters 102 and 104 are analog, or can comprise an interpolator if filters 102 and 104 are digital.

While the invention has been described with reference to the preferred embodiment, it will be appreciated by those of ordinary skill in the art that modifications can be made to the structure and function of the invention, without departing from the spirit and scope thereof. For example, estimator 12 may be other than a Gardner-type as long as it is substantially insensitive to a carrier frequency offset, or if the network is locked to carrier frequency Fc. Also, sampler 106 could be placed before filters 102 and 104 in FIG. 5, in which case sampler 106 would serve as an analog to digital converter or interpolator before the filters. In this position sampler 106 would exhibit a higher, four times, sampling rate compared to being located after filters 102 and 104 as illustrated.

What is claimed is:

1. A symbol timing error processing system for a carrierless amplitude phase (CAP) signal, comprising:

a reference signal generator responsive to a signal at the center frequency of said CAP signal for producing an output signal for causing a shift of said CAP signal toward baseband;

a complex multiplier having a first input for receiving said CAP signal, a second input for receiving said output signal from said reference signal generator, and an output; and an error estimator coupled to said output of said multiplier for producing a symbol timing error representative signal.

2. A system according to claim 1, further including a control network responsive to said symbol timing error representative signal for producing a timing control signal; and a symbol sampling network responsive to said timing control signal; wherein said estimator is substantially insensitive to a frequency offset of said center frequency.

3. A system according to claim 1, wherein said error estimator is Gardner-type error estimator.

4. A system according to claim 3, wherein said reference signal generator is a numerically controlled oscillator.

5. A system according to claim 1, wherein said error estimator is a Gardner-type error estimator;

said reference signal generator produces complex output signals representing sine and cosine functions; and said multiplier is a complex multiplier with a pair of inputs for respectively receiving mutually quadrature phased CAP signals, a pair of inputs for respectively receiving said sine and cosine function signals, and a pair of outputs coupled to respective inputs of said error estimator.

6. In a system for processing a carrierless Amplitude Phase (CAP) signal including an inPhase filter having a CAP input and an Ir output, a quadrature filter having a CAP input and a Qr output, a sampling means responsive to signals Ir and Qr and providing output signals Irs and Qrs, and a symbol-to-data map means responsive to signals Irs and Qrs and providing a Data output, the improvement comprising:

a symbol timing estimator having as inputs Ir and Qr and providing a symbol timing representative signal output and comprising:

a complex multiplier having as an input said signals Ir and Qr and for producing two complex multiplier outputs;

an STR error estimator having as two inputs the two outputs of said complex multiplier and for producing the symbol timing error signal as an output; and, an oscillator having a center frequency as an input and cosine and -sine signals as outputs, wherein said cosine and -sine signals comprise two additional inputs to said complex multiplier;

a filter for filtering said symbol timing representative signal to produce a filtered output signal; and an oscillator having as an input said filtered output signal and for producing as an output a symbol timing information signal.

7. The system of claim 6 wherein said oscillator is a numerically controlled oscillator and comprises:

an adder having as one input said center frequency;

a delay means having as one input the output of said adder, said delay means also having an output which is connected to and forms a second input signal for said adder; and a sin/cos lookup table having as an input the output signal from said delay means, wherein said sine/cosine look-up table produce said cosine and -sine signals for said complex multiplier.

8. The system of claim 6, wherein said STR error estimator comprises a Gardener-type error estimator.

9. A symbol timing error estimator for use with carrierless amplitude phase (CAP) signal, comprising:

a complex multiplier having as inputs quadrature signals Ir and Qr for producing two complex multiplier outputs;

a Gardner-type error estimator responsive to said quadrature signals for producing a symbol timing recovery error signal as an output; and an oscillator responsive to a signal at the center frequency of said CAP signal for producing a complex sinusoidal-type output signal for application to an input of said complex multiplier.

* * * * *